United States Patent [19]

Apple

[11] Patent Number: 6,048,265
[45] Date of Patent: Apr. 11, 2000

[54] AEROSOL DISPENSER FOR USE IN VEHICLES

[76] Inventor: Clarence L. Apple, P.O. Box 44124, Shreveport, La. 71134

[21] Appl. No.: 09/164,754

[22] Filed: Oct. 1, 1998

[51] Int. Cl.⁷ .................................................. B60H 3/00
[52] U.S. Cl. ........................... 454/157; 422/123; 422/124
[58] Field of Search ............................ 454/157; 422/123, 422/124

[56] References Cited

U.S. PATENT DOCUMENTS

| | | |
|---|---|---|
| 3,259,050 | 7/1966 | Grimm ..................... 454/157 |
| 4,677,902 | 7/1987 | Takemasa . |
| 4,805,520 | 2/1989 | Freedman . |
| 4,867,045 | 9/1989 | Freedman ................. 454/157 |
| 4,913,034 | 4/1990 | Ripple et al. . |
| 5,297,988 | 3/1994 | Nishino et al. . |
| 5,833,929 | 11/1998 | Watson et al. ........ 454/157 X |

FOREIGN PATENT DOCUMENTS

| | | | |
|---|---|---|---|
| 27 28 393 | 1/1979 | Germany ............................. 454/157 |
| 61-237946 | 10/1986 | Japan ...................................... 454/157 |
| 62-160913 | 7/1987 | Japan ...................................... 454/157 |

*Primary Examiner*—Harold Joyce
*Attorney, Agent, or Firm*—George R. Schultz; Akin, Gump, Strauss, Hauer & Feld, LLP

[57] ABSTRACT

A method for the removal or elimination of unwanted odors in the passenger compartment or air circulation system of an automobile. Which employs an aerosol dispensing unit that releases substantially all of its load of an aerosol composition in a single use. The aerosol composition can comprise a complex blend of essential oils, dispensing aid and solubilizing agent as well as other agents known to those of skill in the art of aerosol dispensing units. A suitable aerosol composition is the X-O odor neutralizer manufacured by the X-O Corporation. The method of the present invention is advantageous over known methods and systems in that it is less expensive than other related methods and provides an immediate and observable benefit.

11 Claims, 1 Drawing Sheet

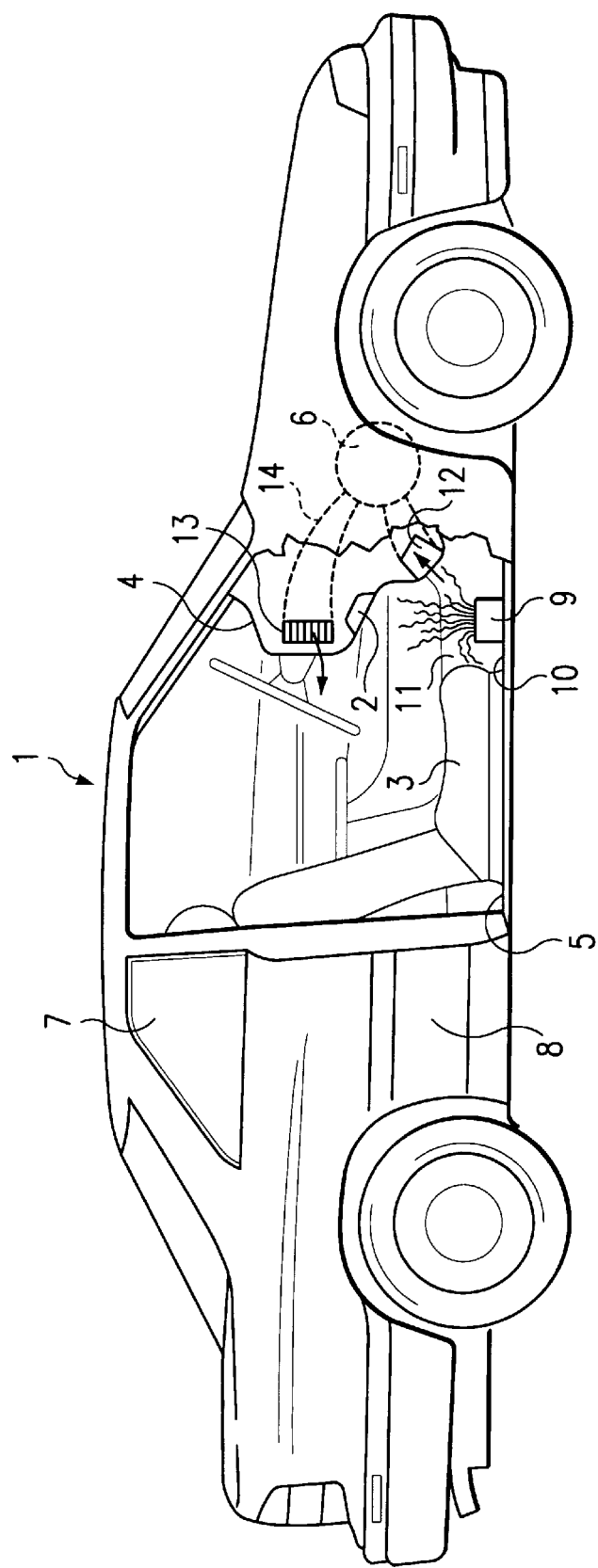

AEROSOL DISPENSER FOR USE IN VEHICLES

FIELD OF THE INVENTION

The present invention relates to methods and devices for treating air circulation systems in vehicles, and more particularly to odor neutralization of an air circulation system in a vehicle.

BACKGROUND OF THE INVENTION

Systems for the deodorization, sanitation or disinfection of the interior or air conditioning system of a vehicle are widely known and have been disclosed in, for example, U.S. Pat. Nos. 5,297,988 to Nishino et al., U.S. Pat. No. 4,913,034 to Ripple et al., U.S. Pat. No. 4,867,045 to Freedman, U.S. Pat. No. 4,805,520 to Freedman, U.S. Pat. No. 4,677,902 to Takemasa and U.S. Pat. No. 3,259,050 to Grimm. Although the art discloses a variety of systems for disinfecting and/or deodorizating an air conditioning system of an automobile, each of the systems generally comprises a dispensing unit connected to the duct work of the air conditioning system. Such known systems are expensive, generally difficult to manufacture and are generally intended for permanent use within the automobile.

Air conditioning systems are widely used in automobiles throughout the world and represent a significant commercial market. The build-up of mold, bacteria, fungi, and offensive and undesirable odors in automobile air conditioning systems remains a significant problem. Thus, there exists a need for simple-to-use, inexpensive and reliable systems for deodorizing and/or disinfecting or neutralizing offensive odors in automobile air conditioning systems.

SUMMARY OF THE INVENTION

The present invention seeks to address and overcome the various disadvantages and deficiencies which are characteristic of related devices known to those of skill in the art. In one aspect, the present invention provides a method of one of reducing, neutralizing, and eliminating an undesirable odor caused by at least one of mold, mildew, bacteria, fungi and a chemical agent in an air circulation system of a vehicle, wherein the method comprises the following steps in any order:

placing a removable aerosol dispensing unit containing an aerosol composition comprising an effective amount of at least one odor neutralizing agent into a passenger compartment of a vehicle;

opening said aerosol dispensing unit such that said odor neutralizing agent is dispensed into said passenger compartment; and activating said air circulation system in said vehicle such that said odor neutralizing agent is circulated throughout said air circulation system for a period of time sufficient to one of reduce and eliminate said undesirable odor in said air circulation system. In one embodiment of the invention, the composition contained within the aerosol dispensing unit can further comprise one or more fragrant agents possessing a desirable odor.

In another embodiment of the invention, the aerosol dispensing unit can release the odor neutralizing agent by at least one of spraying, misting, fogging, smoking, atomizing, dispersing, and propelling.

The composition can be organic solvent- or water-based and can further comprise additional excipients typically used in the art of aerosol dispensing units.

The method of the present invention can be used in vehicles having an air circulation system and a substantially fully encloseable passenger compartment. Exemplary vehicles include an automobile, truck, van, bus, train, airplane, helicopter, trolley and boat.

Additional features and advantages of the present invention will be readily apparent to those of ordinary skill in the art upon a reading of the following detailed description of presently preferred but nonetheless illustrative embodiments of the present invention.

BRIEF DESCRIPTION OF THE DRAWINGS

The following drawing is part of the present specification and is included to further demonstrate certain aspects of the invention. The invention may be better understood by reference to one or more drawings in combination with the detailed description of the specific embodiments presented herein.

FIG. 1 is a partial sectional side elevation view of a vehicle practicing the method of the invention.

DETAILED DESCRIPTION OF THE INVENTION

A preferred embodiment of the method of the invention comprises the following steps:

placing a removable aerosol dispensing unit containing a water-based aerosol composition comprising water and an effective amount of at least one odor neutralizing agent into a passenger compartment of an automobile;

opening said aerosol dispensing unit such that said at least one odor neutralizing agent is dispensed into said passenger compartment; and activating a blower fan in an air circulation in said automobile such that said at least one odor neutralizing agent is circulated substantially throughout said air circulation system for a period of time sufficient to one of reduce and eliminate an undesirable odor caused by at least one of mold, mildew, bacteria, fungi and a chemical agent in said air circulation system.

Referring now to FIG. 1, the method for one of reducing and eliminating an odor caused by at least one of mold, mildew, bacteria, fungi and a chemical agent in an air conditioning system of a vehicle can comprise the following steps:

1. cleaning the interior of the vehicle (1) including ash trays (2), seating area (3), dashboard (4) and carpeting (5); and in any order
2. switching the air conditioning system of the vehicle on to maximum recirculation and maximum fan speed;
3. activating a blower motor (6) of the air conditioning system, optionally with running the engine;
4. closing all windows (7) and doors (8) in the vehicle (1);
5. placing and activating an aerosol dispensing unit (9) on a floorboard (10) such that at least a portion of an aerosol composition therein (11) is dispensed directly toward and drawn in by an intake port (12) of the air conditioning system of the vehicle;
6. allowing the aerosol dispensing unit to dispense substantially its complete load of aerosol composition while the air conditioning system is on for a period of about ten or more minutes; and
7. airing out the automobile by opening at least one door or window thereof The air circulation system of a vehicle will generally comprise a blower fan (6), condenser (not shown), air filtration unit (not shown), duct work (I 4), at least one air intake (12), at least one air exhaust (13), and other optional components. The air intake can draw air from within the passenger compartment of the vehicle or from the exterior of the vehicle.

The aerosol dispensing unit is intended to be removable and preferably a full release system, thereby generally permitting a single use prior to disposal. A wide variety of aerosol dispensing units known to those of skill in the art can be used according to the present invention to reduce or eliminate odors arising from microbes or odoriferous agents. Such systems can employ a variety of mechanisms for spraying, misting, fogging, atomizing or otherwise dispersing the aerosol composition. Exemplary aerosol dispensing units include a spray can, a "bomb," fogger, atomizer, mister, sprayer, or vaporizer.

The aerosol composition will generally comprise at least one odor neutralizing agent which can be a biocide or biostatic agent since odors emitted by an air circulation system of an automobile are generally the result of the growth of mold, mildew, bacteria, fungi, or other biological agents or chemical agents within the duct work or filtration unit of the air circulation system.

A fragrant agent used within the aerosol dispensing unit according to the invention will generally have a desirable odor. Such agents are well known to those of skill in the art and can include an oil, liquid, solid or gas. Exemplary fragrant agents include a complex blend of essential oils such as the X-O odor neutralizer manufactured by X-O Corp. (Dallas, Tex.).

The present method is intended to neutralize, reduce and/or eliminate odors in an air circulation system of a vehicle.

The aerosol composition contained within the aerosol dispensing unit can comprise additional agents known in the art for use in such dispensing units. Such agents can include, for example, alcohol, surfactants and deionized water.

In a preferred embodiment, the aerosol composition will comprise water, a solubilizing agent, a dispersing aid, and a complex blend of essential oils.

As used herein, the term "biocide" refers to an agent that will kill one or more of the following biological life forms such as mold, mildew, bacteria, fungi. Exemplary biocides include anti-fungal, antibacterial, antimicrobial, antimildew and other such agents known to those of skill in the art.

As used herein, the term "biostatic agent" refers to a chemical agent that can at least inhibit or slow the rate of growth or proliferation of biological life forms including at least one of mold, mildew, bacteria and fungi.

As used herein, the term "solubilizing agent" refers to one or more chemical agents used to aid in the dissolution of insoluble components present within the aerosol composition. Exemplary solubilizing agents include alkyl polyglycoside and cetylpyridinium chloride.

As used herein, a "dispensing aid" refers to at least one or more chemical agents used to facilitate dispensing of the aerosol composition from the aerosol dispensing unit. Such dispensing aids are well known in the art and can comprise one or more of a propellant, gas, liquid, volatile substance, and propulsion activator.

It will be understood by those in the art that the period of time to one of reduce and eliminate an undesirable odor according to the method of the invention may be varied as desired and can include a period of time which is at least one minute, at least five minutes, at least ten minutes, at least fifteen minutes, at least thirty minutes, and up to a period of at least one or more days. The optimal amount of time sufficient to one of reduce and eliminate the undesirable odor may vary according to the source of the undesirable odor, the type of odor neutralizing agent comprised within the aerosol composition of the aerosol dispensing unit, and the degree of undesirable odor present in the air circulatation system of a vehicle.

Aerosol dispensing units which can be used according to the method of the present invention are available from a wide variety of commercial sources such as Sexton, Continental or US Can. In a preferred embodiment, the aerosol dispensing unit is a 202×509 can which is available from US Can.

The above is a detailed description of particular embodiments of the invention. Those with skill in the art should in light of the present disclosure appreciate that obvious modifications of the embodiments disclosed herein can be made without departing from the spirit and scope of the invention. All of the embodiments disclosed and claimed herein can be made and executed without undue experimentation in light of the present disclosure. The claims and specification should not be construed to unduly narrow the full scope of protection to which the present invention is entitled.

What is claimed is:

1. A method of one of reducing, eliminating and neutralizing undesirable odors in an air circulation system of an automobile vehicle, the method comprising the following steps of:

placing a portable removable aerosol dispensing unit containing an aerosol composition comprising an effective amount of at least one odor neutralizing agent into a passenger compartment of said vehicle in a position substantially between a seating area of said vehicle and a dashboard of said vehicle;

opening said aerosol dispensing unit such that said odor neutralizing agent is dispensed into said passenger compartment onto a floorboard and under said dashboard of said vehicle;

activating a blower motor of said air circulation system in said vehicle and activating said air circulation system such that said odor neutralizing agent is recirculated throughout said passenger compartment and said air circulation system for a period of time sufficient to one of reduce and eliminate said undesirable odor in said air circulation system and vehicle compartment; and removing said aerosol dispensing unit from said position.

2. The method of claim 1 wherein said composition further comprises at least one fragrant agent possessing a desirable odor.

3. The method of claim 1 wherein said dispensing unit releases said odor neutralizing agent by at least one of spraying, misting, fogging, smoking and atomizing said aerosol composition.

4. The method of claim 1 wherein said period of time is at least five minutes.

5. The method of claim 1 wherein said period of time is at least ten minutes.

6. The method of claim 1 wherein said aerosol dispensing unit releases substantially all of its aerosol composition during a single use.

7. The method of claim 1 wherein said aerosol dispensing unit is a fogger.

8. The method of claim 1 wherein said odor neutralizing agent comprises at least one of a fragrant agent biocide and biostatic agent and water and alcohol.

9. The method of claim 8 wherein said aerosol composition further comprises a dispensing aid and a solubilizing agent.

10. The method of claim 1 wherein said aerosol composition is a water-based composition.

11. The method of claim 1 wherein said aerosol composition comprises extracts of herbs, fruits and cereal grains in substantially pure deionized water.

\* \* \* \* \*